S. Stout.
Harness Hook.

Nº 78,154. Patented May 19, 1868.

Witnesses:
H. C. Ashkettle
J. A. Fraser

Inventor;
S. Stout
per Munn & Co
attorneys

United States Patent Office.

STEPHEN STOUT, OF TREMONT, ILLINOIS.

Letters Patent No. 78,154, dated May 19, 1868.

IMPROVED TRACE-HOLDER.

*The Schedule referred to in these Letters Patent and making part of the same.*

TO ALL WHOM IT MAY CONCERN:

Be it known that I, STEPHEN STOUT, of Tremont, in the county of Tazewell, and State of Illinois, have invented a new and improved Trace-Holder for Harnesses; and I do hereby declare that the following is a full, clear, and exact description thereof, which will enable others skilled in the art to make and use the same, reference being had to the accompanying drawings, forming part of this specification.

Similar letters of reference indicate corresponding parts.

My invention has for its object to furnish a neat, simple, and convenient device for attachment to the harness, upon which the traces may be hooked when detached from the whiffle-tree, so as to hold them securely, and prevent their dropping down, and being stepped upon by the horses, or being injured by tying them; and it consists in attaching to the harness, directly above the horse's hips, or at the point where the hip-straps are attached to said back-strap, a device so formed that the traces may be hooked upon it, and in the construction of the device for this purpose, as hereinafter more fully described.

A is the back-strap of the harness. B is the ring, to which the rear end of the back-strap, the upper end of the strap C, to which the crupper is attached, and the upper ends of the hip-straps D, are all attached.

Figure 1:
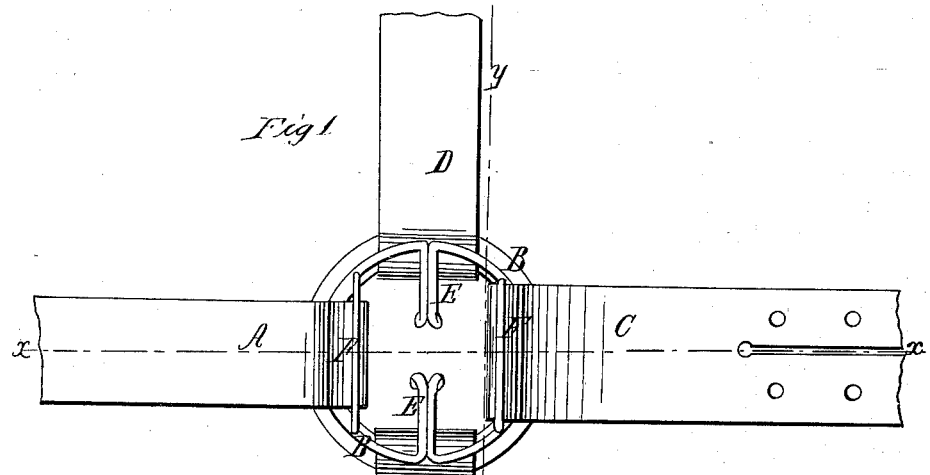
Figure 1 is a top view of my improved trace-holder attached to a harness.
Figure 2:
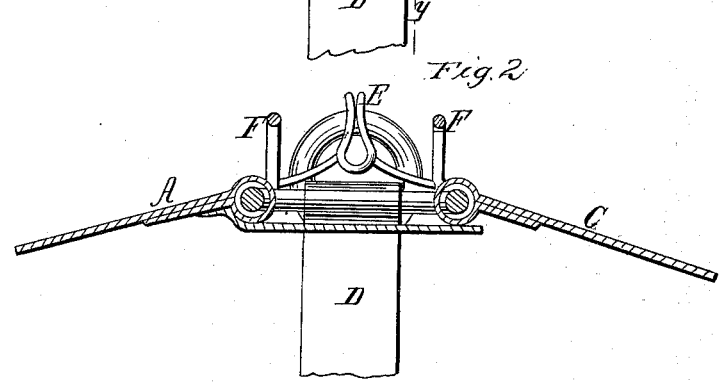
Figure 2 is a longitudinal section of the same, taken through the line $x\ x$, fig. 1.
Figure 3:
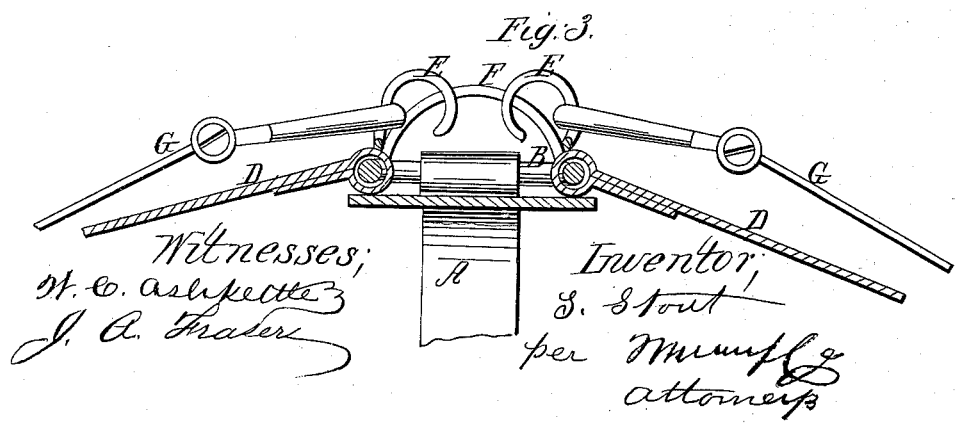
Figure 3 is a cross-section of the same, taken through the line $y\ y$, fig. 1.

To the ring B are attached, or upon it are formed, two hooks, E, in such a way as to form loops to allow the hip-straps D to be attached to said ring B, as shown in figs. 1, 2, and 3.

F are loops or half circles attached to or formed upon the ring B, upon both sides of the hooks E, to serve as guards to prevent the reins from catching upon the said hooks E. When the traces G are detached from the whiffle-tree they are hooked upon the hooks E, as shown in figs. 2 and 3, by which they are securely held in place, and prevented from dropping down to the ground and becoming soiled or being stepped upon by the horses.

I claim as new, and desire to secure by Letters Patent—

The device B E F, formed by forming the hooks E and guard-loops F upon or attaching them to the ring B, constructed substantially as herein shown and described, and for the purpose set forth.

The above specification of my invention signed by me, this 22d day of January, 1868.

STEPHEN STOUT.

Witnesses:
W. W. W. JONES,
A. R. HAMPTON.